United States Patent [19] Best Available Copy [11] E Re. 31,230

Swift et al. Best Available Copy [45] Reissued May 3, 1983

[54] BREAKERLESS FLYWHEEL MAGNETO IGNITION SYSTEM

[75] Inventors: Thomas E. Swift, West Springfield; Elwin J. Brayley, East Longmeadow; Ray C. Noddin, Chicopee, all of Mass.

[73] Assignee: Eltra Corporation, Toledo, Ohio

[21] Appl. No.: 91,292

[22] Filed: Nov. 5, 1979

Related U.S. Patent Documents

Reissue of:

[64] Patent No.: 3,405,347
Issued: Oct. 8, 1968
Appl. No.: 491,805
Filed: Sep. 30, 1965

U.S. Applications:

[63] Continuation-in-part of Ser. No. 469,076, Jul. 2, 1965, abandoned.

[51] Int. Cl.[3] ..... H05B 41/36; H02K 11/00; H02P 9/00

[52] U.S. Cl. ..... 322/91; 123/601; 310/70 A; 315/209 SC

[58] Field of Search ..... 310/70, 70 A; 315/209 SC; 123/149 A, 601, 602; 322/91, 94, 89

[56] References Cited

U.S. PATENT DOCUMENTS

| | | | |
|---|---|---|---|
| Re. 28,392 | 4/1975 | McMillen | 123/149 A |
| 2,583,466 | 1/1952 | Brownlee | 310/153 |
| 3,051,870 | 8/1962 | Kirk | 315/177 |
| 3,186,397 | 6/1965 | Loudon . | |
| 3,229,162 | 1/1966 | Loudon | 315/218 X |
| 3,240,198 | 3/1966 | Loudon et al. | 123/602 |
| 3,253,164 | 5/1966 | Konopa . | |
| 3,311,783 | 3/1967 | Gibbs et al. | 315/209 SC |
| 3,312,860 | 4/1967 | Sturm . | |
| 3,331,986 | 7/1967 | Hardin et al. | 315/209 SC |
| 3,335,320 | 8/1967 | Quinn | 315/209 SC UX |
| 3,516,396 | 6/1970 | Lawson, Jr. | 315/209 SC |
| 3,622,837 | 11/1971 | Gellman | 315/209 SC X |

*Primary Examiner*—R. J. Hickey
*Attorney, Agent, or Firm*—James P. DeClercq

[57] ABSTRACT

This invention provides an improved magneto system which is reliable and stable irrespective of environmental conditions, wear and the like, and has no contacts, breakers or other moving parts in addition to the rotor itself. The conduction in the magneto winding means is initiated and terminated by a solid state device and preferably a solid state threshold device which is responsive to impulses of electrical energy to change its state between one of conduction and nonconduction whereby magneto operation can be controlled by relatively short duration trigger impulses. The trigger impulses may automatically produce a spark advance for increased magneto speeds.

9 Claims, 16 Drawing Figures

BREAKERLESS FLYWHEEL MAGNETO IGNITION SYSTEM

Matter enclosed in heavy brackets [ ] appears in the original patent but forms no part of this reissue specification; matter printed in italics indicates the additions made by reissue.

This application is a continuation-in-part of our earlier application, Ser. No. 469,076, filed July 2, 1965, and now abandoned.

This invention relates to improved magneto systems, and, more particularly, to an improved magneto system utilizing solid state control devices for control purposes and rotary devices for voltage generation.

Magneto systems are widely used throughout industry for various purposes, but their greatest use is in ignition systems for automotive vehicles, marine engines, aircraft engines, engines for portable equipment, auxiliary power units and the like.

Various techniques have been employed to utilize rotating magnetic fields to generate substantial impulse voltages for ignition purposes. One successful flywheel magneto system is that disclosed in Brownlee Patent No. 2,583,466. As disclosed in that patent, the magneto system includes a fixed electromagnetic structure comprising first and second coils wound upon the central leg of an E-type core structure. The core is mounted on a stator member and the faces of the three legs of the core are shaped to conform to an outer annular surface of the stator. This surface conforms to the inner surface of a rotor and flywheel. The core faces cooperation with an armature rotatably mounted in the rotor and flywheel and a permanent magnet is included in the armature structure. As the flywheel turns, it generates a cyclic flux in the E-shaped core. The flux in the central leg is first of one given polarity and then rapidly reverses to the opposite polarity. The rapid flux reversal is generally employed in some manner to generate an ignition impulse in the second coil.

In the flywheel magneto of the instant invention, the substantial voltage for spark ignition is generated in the second coil by maintaining conduction in the first coil until a time when the flux reversal, $d\phi/dt$, is near its maximum value and then rapidly opening the circuit of the first coil to generate a very substantial transient voltage in both coils. As is well understood in the art, a low impedance closely coupled coil in a magnetic circuit experiences an induced current which opposes any change in flux in that magnetic circuit and, thus, the flux density in the core during a magneto cycle when the first coil is effectively shorted will be less than the flux value when the first coil is open or in a high impedance circuit. Thus, when the circuit of the first coil is opened, the inherent operation of the circuit will tend to produce a step-function flux increase which will, in turn, induce very substantial voltages in the first and second coils. The substantially increased voltage in the second coil will be sufficient for breakdown of the spark gap and ignition.

In accordance with the instant invention, systems are provided including solid state control devices and trigger windings to effectively short-circuit the first coil at predetermined times in each magneto cycle and to rapidly alter the parameters of the circuit of the first coil at a critical time to produce an open-circuit effect to generate an ignition impulse. The solid state control devices are controlled in part by a triggering assembly including coil means and an associated armature mounted for timed relative rotation.

It is one principal object of this invention to provide an improved magneto system which is reliable and stable irrespective of environmental conditions, wear and the like.

It is another important object of this invention to provide an improved magneto system which relies for its operation upon the electromagnetic triggering of semiconductor devices for control of the operation thereof.

A further object of this invention is the provision of an improved magneto system having a magneto coil assembly and a triggering coil assembly mounted in cooperation with a rotatable flywheel having appropriate armatures mounted thereon for magneto operation.

Another object of this invention is the provision of an improved magneto system including triggering means requiring no mechanical contacts, camming surfaces or rubbing or contacting parts of any kind.

A further object of this invention is the provision of a magneto system using solid state control devices and means for automatically varying ignition timing with engine speed by controlling the triggering of said devices.

It is another object of this invention to produce a magneto system utilizing solid state threshold devices to provide improved output wave form, more consistent firing time, and inherent spark retardation.

Further and additional objects of this invention will become manifest from a consideration of this description, the accompanying drawings and the appended claims.

In one form of this invention, an engine mounted stator and an engine driven rotor are provided. The stator has an E-shaped magneto core with two windings mounted on the central leg and a triggering core having a permanent magnet disposed therein and one or more triggering coils disposed thereon. A triggering armature and a magneto armature and magnet are mounted in a flywheel rotatably mounted on the stator and shaped to cooperate with the magneto core and the triggering core to produce closely coupled magnetic field structures during some portion of each cycle of rotation thereof. A solid state control device is controlled by the triggering coil means and, in turn, controls the current flow through one of the magneto coils to produce a step function flux change. As is well known, such a flux change induces voltages in associated coils in accordance with the equation $$E = -n\frac{d\phi}{dt}\cdot 10^{-8}$$

The second magneto coil is closely coupled to the first coil, has a very substantial number of turns, and experiences a very high induced voltage. This voltage provides the impulse output for ignition purposes and may be connected directly to a spark plug, or to a distributor which, in turn, energizes a plurality of spark plugs.

For a more complete understanding of this invention, reference will now be made to the accompanying drawings wherein.

Figure 1:
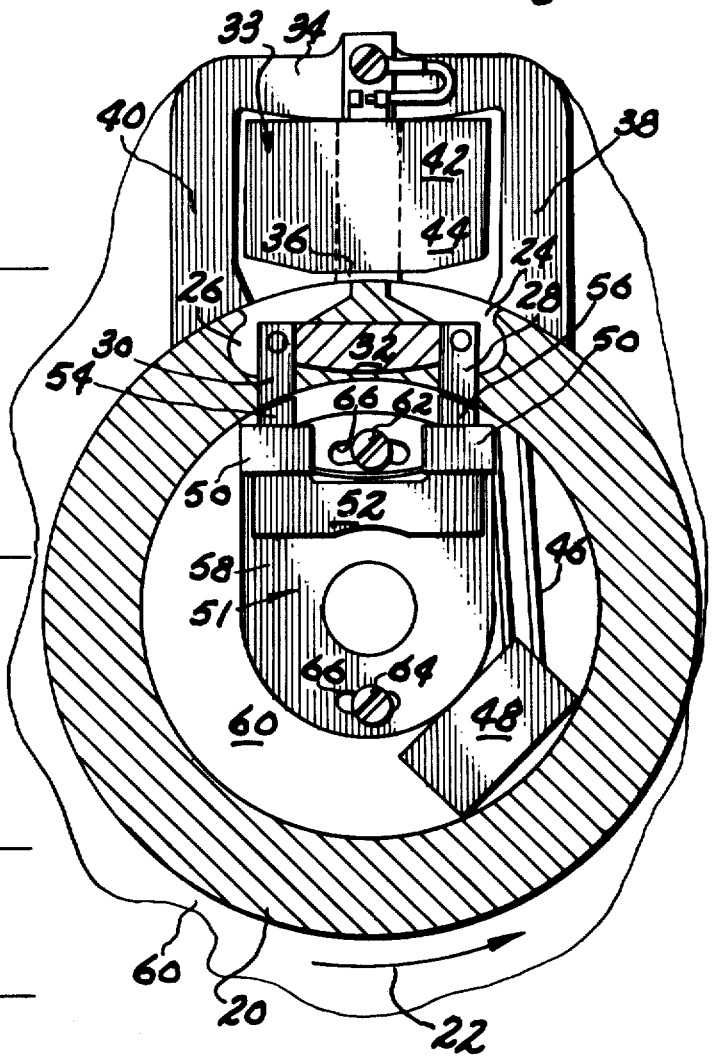
FIG. 1 is a diagrammatic view of the mechanical elements of one embodiment of this invention.
Figure 4:
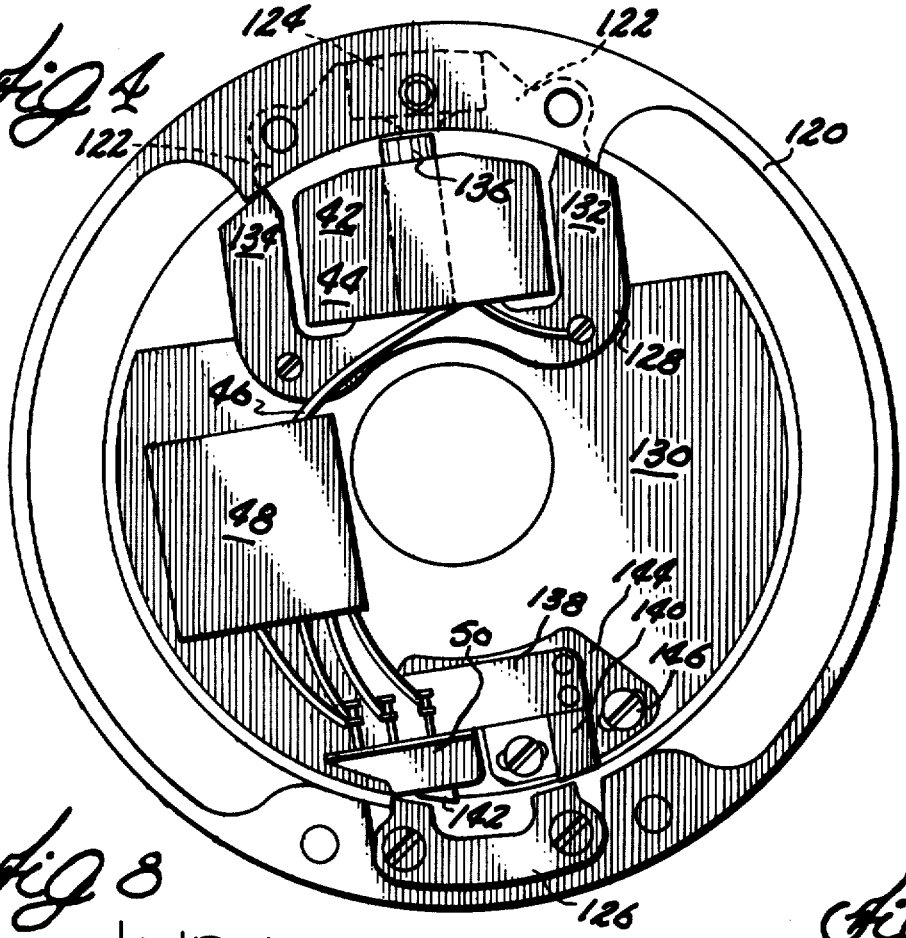
FIG. 4 illustrates an alternate embodiment of the invention including an alternate means for mounting the various components.
Figure 6:
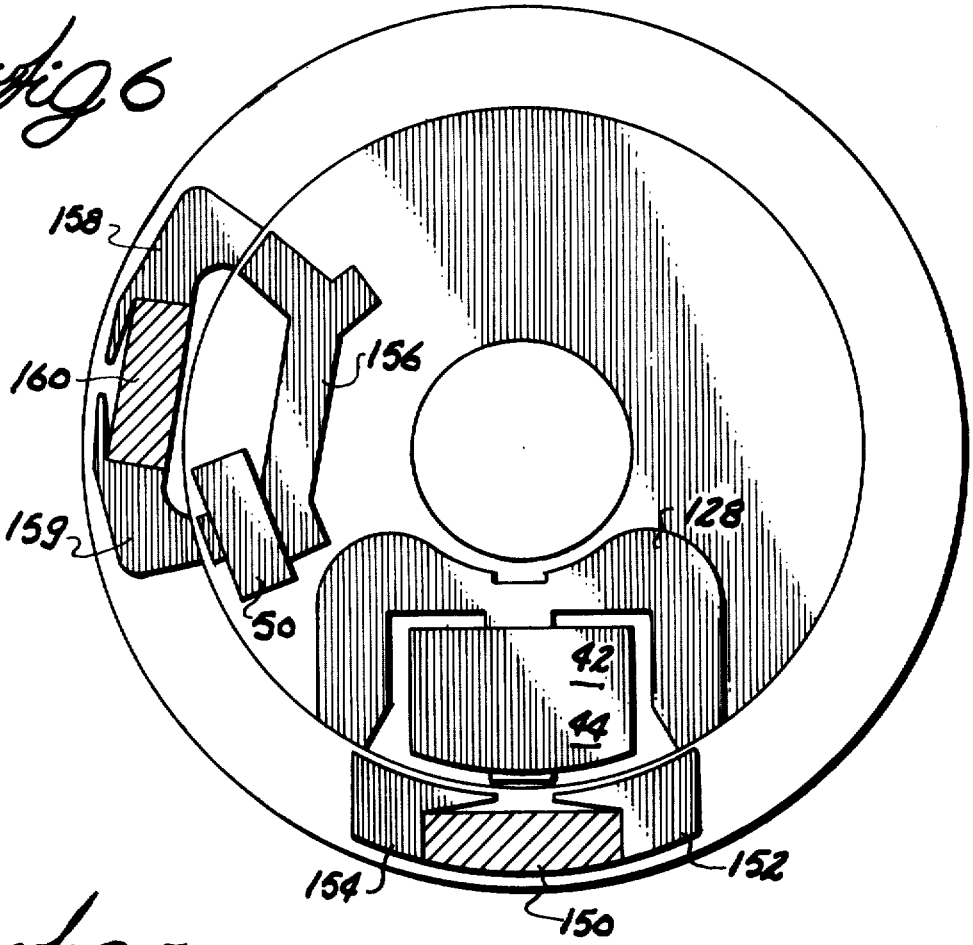
FIG. 6 illustrates another embodiment of the invention providing an alternate manner in which the various components may be mounted in the stator and rotor.

Referring now to the drawings, FIGS. 1, 4 and 6 illustrate three mechanical arrangements of the basic elements of the invention, namely, the magneto coil system, the triggering coil system, and the control circuitry. On the other hand, FIGS. 3, 5, 7 and 15 illustrate four circuit arrangements utilizing one, two, three and two triggering coils, respectively. While all four embodiments incorporate certain basic concepts of this invention, each has its special advantages, and each may be employed in any one of the three mechanical arrangements.

Mechanical construction of magneto system

Referring more particularly to FIG. 1, a flywheel or rotor 20 is illustrated diagrammatically mounted on a stator 60. As the bearings for the rotor 20, the configuration of the stator 60, and the mechanical construction of the parts for balance and the like have no bearing whatsoever upon the invention, all details thereof have been omitted. The basic arrangement shown in FIGS. 1 and 2 of the Brownlee Patent No. 2,583,466 may be used for example, with the modifications illustrated herein.

The flywheel 20 is mounted to rotate in the direction illustrated by arrow 22. It is formed of a nonmagnetic material and includes therein a pair of magnetic magneto pole pieces 24 and 26 which cooperate with a magneto coil assembly and a pair of magnetic trigger pole pieces 28 and 30 which cooperate with a triggering coil assembly. A permanent magnet 32, preferably formed of alnico or some similar high permeability, high retentivity material, is disposed between the pole pieces 24 and 26 and between the pole pieces 28 and 30. The particular polarity of the magnet is not critical because in this embodiment the magneto and triggering circuits will be properly phased because of the use of a single magnet. The pole parts 24, 26, 28, 30 and 32, and counterweights as required, may be cast into a unitary flywheel formed of aluminum or the like.

The magnetic core 34 of the magneto coil assembly 33 is mounted adjacent the flywheel 20 on the stator 60 and includes a central leg 36, a forward leg 38, and a final leg 40. First and second coils or windings 42 and 44 are wound upon the central leg 36 and are connected through appropriate conductors 46 to a component housing 48. The components contained in housing 48 are for the control circuits to be described hereinafter and are conventional and readily available electronic components. Thus they are not individually illustrated in FIG. 1, but are all included within the circuit diagrams forming a part of this disclosure.

A trigger coil assembly 51 is mounted upon the stator 60 and includes one or more triggering coils 50 mounted on a triggering core 52. The core 52 includes forward leg 56 and final leg 54 which cooperate with the poles 28 and 30 mounted in flywheel 20 to produce desired flux linkage. The opposed faces of the various armatures and cores are shaped to fit closely for maximum magnetic coupling but are free of mechanical contact. The core 34 may be fixed to the stator 60 which is adjustably mounted on the associated engine for timing adjustment. The core 52 is secured to a mounting plate 58 which is secured on the stator 60 by a pair of machine screws 62 and 64. The machine screws 62 and 64 are threaded into the stator 60 through slots 66 formed in the mounting piece 58, and the slots are slightly arcuate so that the trigger assembly can be adjusted relative to the magneto core 34 to provide adjustment of the so-called "edge gap" (the angular relationship between the magneto core 34 and the trigger core 52). The trigger coil 50 is connected to the component housing 48 through conductor 68.

As will be more apparent from the description of the circuit and its operation, rotation of the flywheel 20 in the direction indicated by arrow 22 will result in the generation of useful magnetic flux in the center leg 32 of magneto core 34 by successively coupling the armature poles 26 and 24 to the central leg 36 and forward leg 38 of the magneto core 34 and then the final leg 40 and central leg 36. As the flywheel proceeds in the direction indicated, the direction of flux produced by permanent magnet 32 in central leg 36 will be rapidly reversed and in substantially zero as the flywheel passes through the position illustrated in FIG. 1. This is illustrated by curve 98 at time $T_4$ in FIG. 2. The permanent magnet 32 will also induce a flux in trigger core 52 as the armature poles 28 and 30 pass adjacent to the core legs 56 and 54, respectively. The flux generated in trigger core 52 is substantially at its maximum value at the position of FIG. 1 as illustrated by curve 99 in FIG. 2, utilized to generate control currents for the magneto as will be described.

Figure 3:
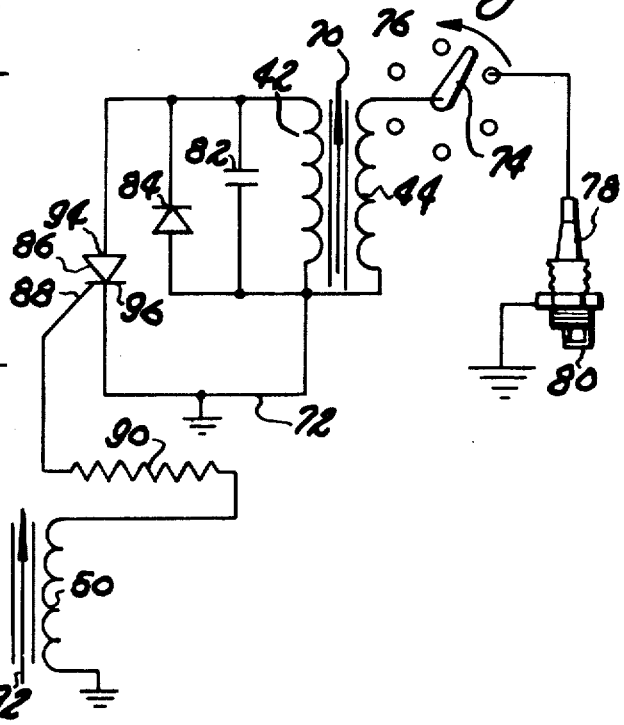
FIG. 3 is a circuit diagram of the embodiment of FIG. 1.

The operation of the circuit of FIG. 3

Referring now to FIG. 3, the first winding 42 of the magneto assembly is diagrammatically shown, coupled magnetically to the second winding 44. The magnetic coupling and source of magnetic flux provided by core 34 and the permanent magnet 32 are illustrated by arrow 70. The second winding 44 is connected between the ground bus 72 and the rotor 74 of a distributor. Each of the points of the distributor 76 will be connected to the central electrode of a spark plug, although only one spark plug 78 is illustrated diagrammatically. The side electrode 80 of the spark plug is connected to ground. Thus a voltage impulse in second coil 44 will be applied through distributor 76 to the spark plug 78, and if sufficient, will provide engine ignition.

Connected directly across the final coil 42 are a capacitor 82, a diode 84 and a solid state threshold device 86. The term "solid state threshold device" or merely "threshold device" means any one of a plurality of solid state devices which are presently available and others which may become available for controlling the flow of current between an anode terminal and a cathode terminal or so-called "conductive terminals" by virtue of a triggering signal applied to a so-called gate or "control terminal." Such devices are identified in various ways by the manufacturers who make them available, and the term solid state threshold device is intended to encompass all such devices. While most of the devices satisfying this definition are four layer, three terminal devices, other four and five layer devices may also be adapted to the invention.

Typical devices satisfying this definition are the PNPN silicon gate-controlled switches (GCS) sold by Texas Instruments, Incorporated under the designation types TIC11, 12, 13 and 15, so-called TOTCR types 241UAUM sold by Westinghouse Electric Corporation, and so-called Transwitches sold by Transitron Electronic Sales Corporation. The devices are all characterized in that they present a relatively high impedance to the flow of current between their conductive terminals (anode to cathode) until they are properly triggered by the application of current to the control terminal (gate). Thereafter, the impedance between the conductive terminals becomes the very low and there is no significant linear control of the current flow by the application of signals to the control terminal. However, upon the application of a substantial reverse current to the control terminal, it is possible to render the device nonconductive and if held nonconductive for a period in the order of 100 microseconds, the device will remain nonconductive even after the control signal is removed.

One typical example of the operating characteristics of such a device is that of Transitron's Transwitch. In that device, the maximum forward and reverse currents at normal temperatures are about 10 microamperes. To turn the device "on" requires a positive signal of approximately 1 volt at the control terminal and a current of 15 milliamperes. Once the device is conductive, the control terminal is ineffective at the 1 volt level, the forward voltage across the device drops to about 2 volts, and the device is capable of conducting up to 5 amperes. To reverse the threshold phenomena and render the device nonconductive, a signal of opposite polarity must be applied to the control terminal. This signal must be up to −20 volt and provide a current up to 200 milliamperes. While such a control signal will stop current flow between the conductive terminals within a few microseconds, some control current must be maintained for approximately 100 microseconds to assure return of the quiescent or "off" condition. Thus, the energy required to turn the device off is substantially greater than the energy required to turn the device on.

Sequence of operations

Returning now to the circuit of FIG. 3, the control terminal 88 of the threshold device 86 is energized through resistor 90 from the trigger coil 50. The arrow 92 represents the magnetic structure associated with coil 50 including the core 52 and the permanent magnet 32 with its associated armature legs 28 and 30. The interrelationship of the magnet coil assembly, trigger coil assembly and circuit components is such that the diode 84 effectively shorts coil 42 during initial flux build-up, threshold device 86 shorts winding 42 during flux reversal, and device 86 then opens the winding 42 to provide a voltage impulse.

Figure 2:
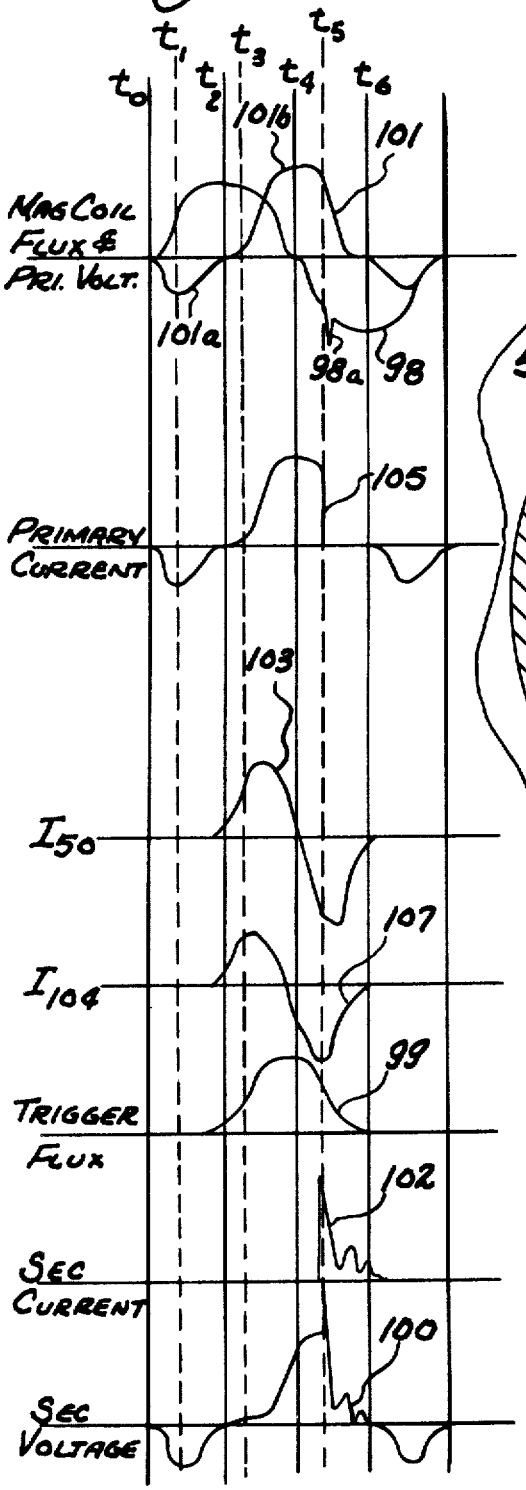
FIG. 2 is a series of curves representing the electrical and magnetic phenomena occurring in the embodiment of FIG. 1 during the ignition cycle thereof.
Figure 10:
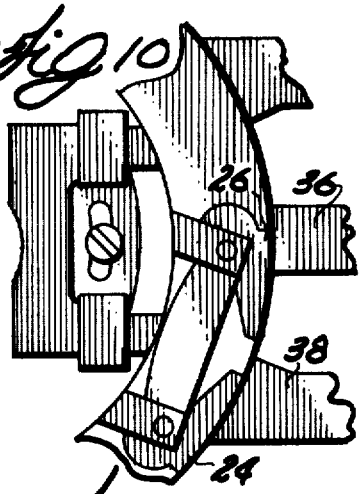

The operation of the foregoing circuit can be best understood by referring to FIG. 2. The abscissa in FIG. 2 is time and represents only a small portion of one complete revolution of the flywheel in the order of 45°. Specific times are designated on the chart of FIG. 2 as $T_0$ through $T_6$, and the relative positions of the coils and armature for the first six of these positions are illustrated in FIGS. 9–14. As the armature poles 26 and 24 approach the core legs 36 and 38 shown in FIG. 9 at time $T_0$, the leading pole 26 begins to cover the central leg 36 of core 34, and the trailing pole 24 begins to cover the forward leg 38. This induces a flux from magnet 32 in the central leg 36 as illustrated by the top curve 98 of FIG. 2. At time $T_0$, the flux begins to increase relatively gradually. At time $T_1$, the armature poles 26 and 24 are somewhat more than half covering the associated core legs 36 and 38 as shown in FIG. 10. At this time, $T_1$, the flux is changing at its maximum rate $d\phi/dt$.

Figure 11:
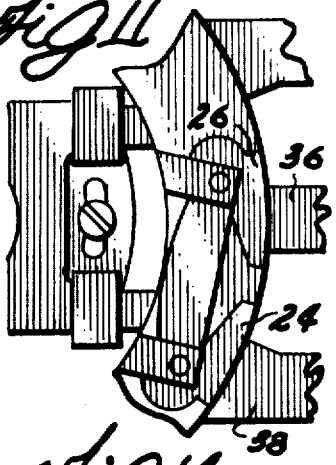
Figure 12:
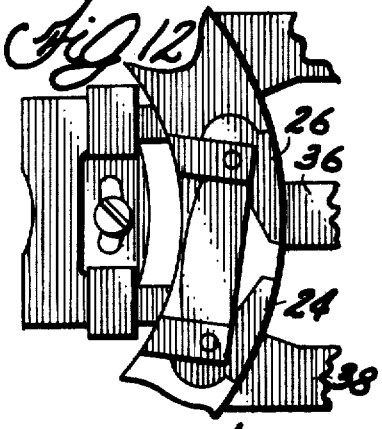
Figure 13:
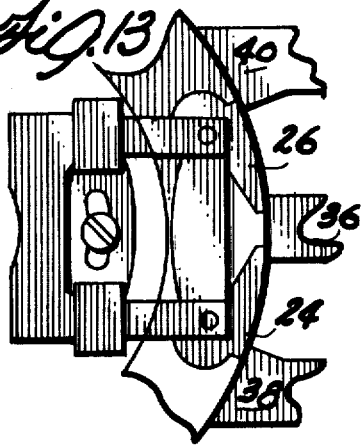
Figure 14:
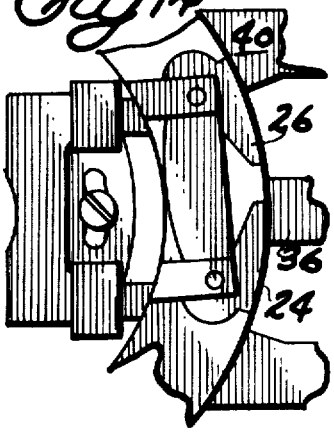

The relationship at time $T_2$ is illustrated in FIG. 11 where the armature poles 26 and 24 are substantially completely covering the core legs 36 and 38. Thus, at time $T_2$, the rate of change of flux $d\phi/dt$ is substantially zero, and the flux curve 98 is at a maximum. As the flywheel continues to the position shown in FIG. 12 (representing $T_3$), the armature poles 26 and 25 are moving beyond the core legs 36 and 38, and the flux density in the central leg 36 is diminished. The relationship at time $T_4$ is illustrated in FIG. 13, showing the armature poles 26 and 24 balanced between the central leg 36 and the forward leg 38 and last leg 40. Thus, while there is substantially opposed flux in the outer legs 38 and 40, the net flux in central leg 36 is substantially zero, and the rate of change $d\phi/dt$ is at a steep negative maximum as shown by curve 98 in FIG. 8. As the flywheel continues, as shown in FIG. 14, the leading pole 26 begins to cover the last leg 40, and trailing pole 24 begins to cover central leg 36 producing a substantial flux change at $T_5$ as illustrated in FIG. 2. This flux pattern generates induced voltages in both the first and second windings 42 and 44 which under open circuit conditions describe the curve 101 in FIG. 2.

At the same time that the foregoing sequence is occurring in the magneto winding structure, the trigger winding structure 52 is experiencing a related flux phenomenon. As the flywheel 20 carries the trigger poles 30 and 28 toward the respective core legs 54 and 56, a positive-going flux is induced in coil 50. The pattern of flux generated in coil 50 is illustrated by curve 99 in FIG. 2, and the current generated thereby is illustrated as curve 103. The flux rises to a significant value at time $T_3$, has a zero rate of change at $T_4$, exhibits a steep slope at $T_5$, and is substantially zero at $T_6$. Because of this flux pattern, significant forward current at $T_2$ and substantial reverse current at time $T_5$ are provided.

Relating these various flux and current phenomena to the circuit shown in FIG. 3 will make the operation of the circuit clear. As the magneto armature approaches the core, increasing positive flux in first winding 42 induces a negative voltage in the first winding in accordance with the relationship: $E=-Nd\phi/dt$. If the windings are open, the shape of the curve would be as illustrated by the first negative hump 101a in FIG. 2. However, diode 84 is connected directly across first winding 42 and provides a shunt whereby substantial current is flowing through diode 84 at time $T_1$ maintaining the voltage thereacross at a relatively low value. This shunting of the first winding 42 also prevents the build-up of voltage in second winding 44, and also avoids the possibility of a maverick spark during the early portion of the ignition cycle. The current reverses by virtue of the change in magnetic flux, and the diode 84 is nonconductive, the capacitor 82 is charged and the threshold device 86 is in a blocking state. Thus, the voltage across winding 42 builds up as shown by curve 101b in FIG. 2. A typical current in first winding 42 is illustrated by curve 105 in FIG. 2.

At time $T_2$, the voltage from trigger coil 50 applied to the control terminal 88 of threshold device 86 also builds up by virtue of the flux in the coil 50. This voltage produces control current in accordance with curve 103, and this control current renders the threshold device 86 conductive between its main conductive terminals, anode 94 and cathode 96. Thus, the first winding 42 is again effectively shorted, now for current in the positive direction, reducing the flux build-up in the core 34.

At time $T_5$, the voltage induced in trigger coil 50 has reversed, as shown in FIG. 2, and is passing negative current through resistor 90 and the control terminal 88 of sufficient magnitude to render the threshold device 86 nonconductive. In accordance with well-known magneto fundamentals, a step-function cut-off of the device 86 tends to produce a drastic change in flux in the core 34 as diagrammatically illustrated by curve 98a in FIG. 2. The rapid flux change in the core induces an ignition voltage in second winding 44 which is applied through distributor 74 to the spark plugs 78. The secondary voltage is illustrated as curve 100 in FIG. 2 and, as shown in the curve, a sudden impulse of voltage is applied to the spark gap at time $T_5$ resulting in spark breakdown. Upon spark breakdown, the second winding 44 is effectively shorted, passing a very substantial secondary current as illustrated by curve 102, and the voltage thereacross drops drastically. A damped harmonic signal can be observed because of the inertia of the various circuit components and particularly winding 42 and capacitor 82. This arrangement improves the load line of the circuit and reduces the magnitude of the transients therein. So-called maverick impulses and ignition impulses at an improper time between $T_0$ and $T_2$ and after $T_6$ are avoided by diode 84.

The trigger coil current wave shape 103 is timed with respect to the magneto current by determining the angular segment represented by the time lapse between $T_2$ and $T_4$ based upon the primary voltage curve 101. This measurement establishes the width of the armature poles 28 and 30 and the core legs 54 and 56. The rise of current wave form 103 is then adjusted for proper timed energization of the control terminal 88.

Figure 5:
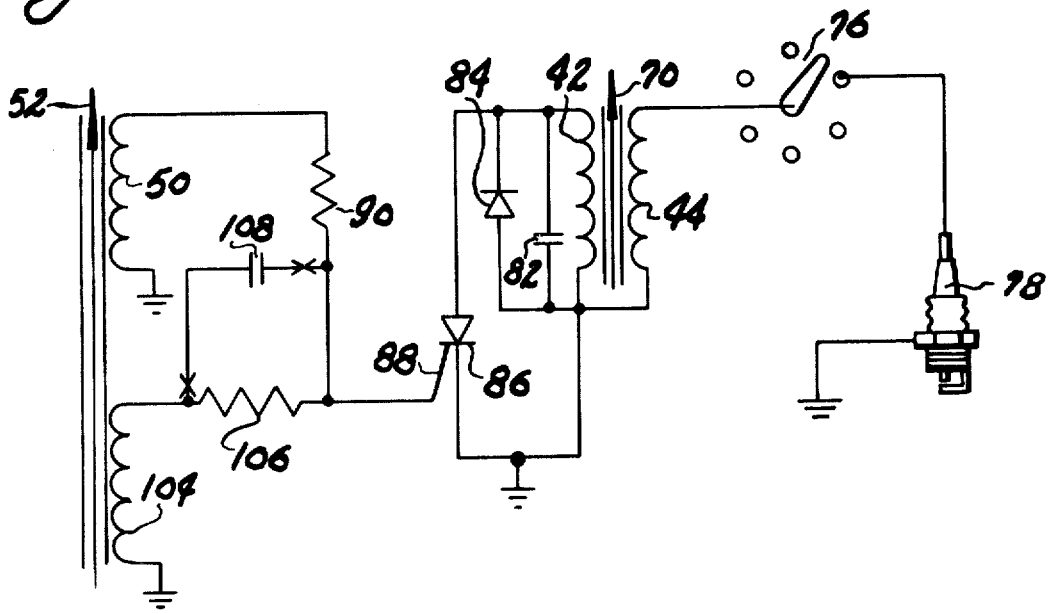
FIG. 5 is an alternate circuit diagram of the various embodiments of FIGS. 1, 4 and 6.
Figure 9:
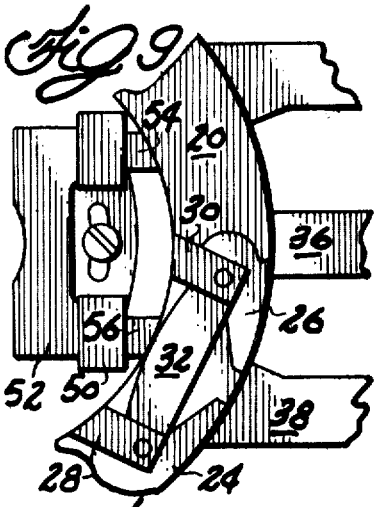
FIGS. 9–14 illustrate the relative disposition of the stator and rotor in the embodiment of FIG. 1 during a typical ignition cycle.

The two trigger impulse embodiment of FIG. 5

An alternate embodiment of the invention having a very similar circuit arrangement and physical structure, but having significant advantages, is illustrated in FIG. 5. As shown in FIG. 5, two triggering coils are employed. The first winding 42 and second winding 44 are mounted on the magnetic structure as in the embodiment of FIG. 3, diagrammatically illustrated by arrow 70. Second winding 44 is connected from ground through a distributor 76 to the gap of a spark plug 78 and, in turn, to ground. A capacitor 82 for energy storage and improved load line characteristics is connected across first winding 42, and diode 84 is also connected across coil 42 to shunt the negative pulse induced in winding 42. The threshold device 86 is connected across the winding 42 with its control terminal 88 connected through a resistor 90 to the first trigger coil 50. A second trigger coil 104 is wound upon the same core 52 as the coil 50 and is connected to the control terminal 88 of the threshold device 86 through a resistor 106. If required for timing purposes, a capacitor 108 may also be employed in a manner to be described for impedance adjustment and phasing.

The circuit illustrated in FIG. 5 provides improved control over ignition timing with varying engine speed. As described above, it is fundamental in magneto operation that induced voltages, which are a function $d\phi/dt$, vary with rotation speed. This basic characteristic of magneto systems is utilized in the instant invention to provide timing advance at accelerated speeds. The operation of tigger coil 50 and an explanation of the current curve 103 appear above. This operation is also characteristic of the embodiment of FIG. 5 at low engine speeds. However, the second trigger coil 104 has a substantially lower inductance and a larger series resistance whereby the pulse resulting therefrom leads the current in coil 50 at normal engine speeds as shown by curve 107 in FIG. 2. The lead increases with increased engine speeds. Furthermore, the circuit components are selected so that the combined energy of coils 50 and 104 is required to control device 86. However, with increased speeds, the voltage rises and current in coil 104 assumes greater and earlier control. In this embodiment, both timing, so-called "edge gap," and the spark advance can be adjusted by varying resistors 90 and 106, or the use of capacitor 108. In one typical embodiment of the invention, resistor 90 is 18 ohms, resistor 106 is 68 ohms, coil 50 has an inductance of 60 mh. and a resistance of 44 ohms, and coil 104 has an inductance of 14 mh. and 18 ohms. In all other respects, the circuit of FIG. 5 functions in a manner substantially identical to the circuit of FIG. 3.

Figure 7:
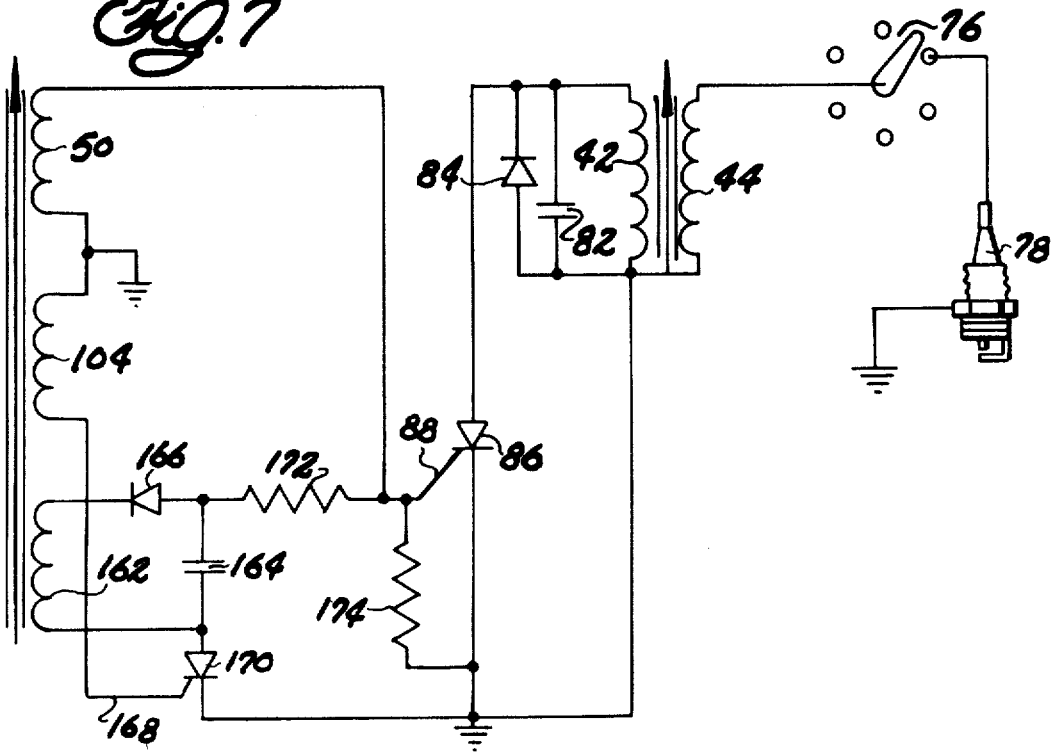
FIG. 7 is a circuit diagram illustrating a third embodiment of this invention employing three triggering coils.

The three winding embodiment of FIG. 7

Figure 8:
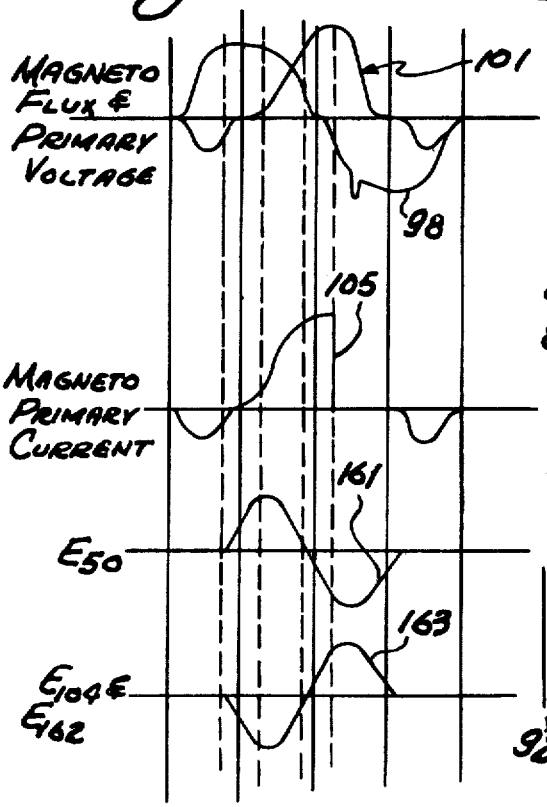
FIG. 8 is a set of curves illustrating the electrical and magnetic phenomena occurring in the embodiment of FIG. 7 during the typical ignition cycle.

Still another embodiment of the invention is illustrated in FIG. 7, and the electrical and mechanical operation thereof is illustrated in the curves of FIG. 8. In the embodiment of FIG. 7, three triggering coils 50, 104 and 162 are employed. The circuit works upon the same principle as already described with the second winding 44 connected through distributor 76 to the spark plug 78 and the first winding 42 shunted by capacitor 82, diode 84 and threshold device 86. The three coils 50, 104 and 162 are all wound upon the same trigger core structure and, thus, the voltages generated therein are as shown in FIG. 8.

In FIG. 8, the curve 161 represents the current in coil 50, and curve 163 represents the current in coils 104 and 162.

Triggering coil 50 directly connected to control terminal 88 initiates conduction through threshold device 86 at an early point in the cycle, substantially at time $T_2$. The voltage induced in coil 162 charges capacitor 164 through diode 166 such that capacitor 164 has the charge as indicated in FIG. 7. The energy stored in capacitor 164 is utilized to turn off the threshold device 86 more rapidly and positively than would be possible in the circuits described above with respect to FIGS. 3 and 5. Furthermore, the circuit can handle greater power requirements.

As the trigger magnet passes the central position and voltages in the trigger coils 50, 104 and 162 are reversed, discharge of capacitor 164 is blocked by diode 166 and the positive voltage of curve 163 is applied to a control terminal 168 of a gate controlled rectifier or so-called SCR 170. At time $T_5$, the signal from trigger coil 104 renders SCR 170 conductive and discharges capacitor 164 through resistor 172 and the control terminal 88 of threshold device 86. Resistor 174 is provided for protection of the threshold device 86. In the embodiment of FIG. 7, trigger coil 162 provides a source of energy for capacitor 164, and this energy is dumped into threshold device 86 at the critical time $T_5$ through SCR 170 in order to terminate conduction at a rapid and positive rate in threshold device 86. This step function of current through first coil 42 produces a substantial transient voltage in second coil 44 sufficient to initiate spark ignition.

Figure 15:
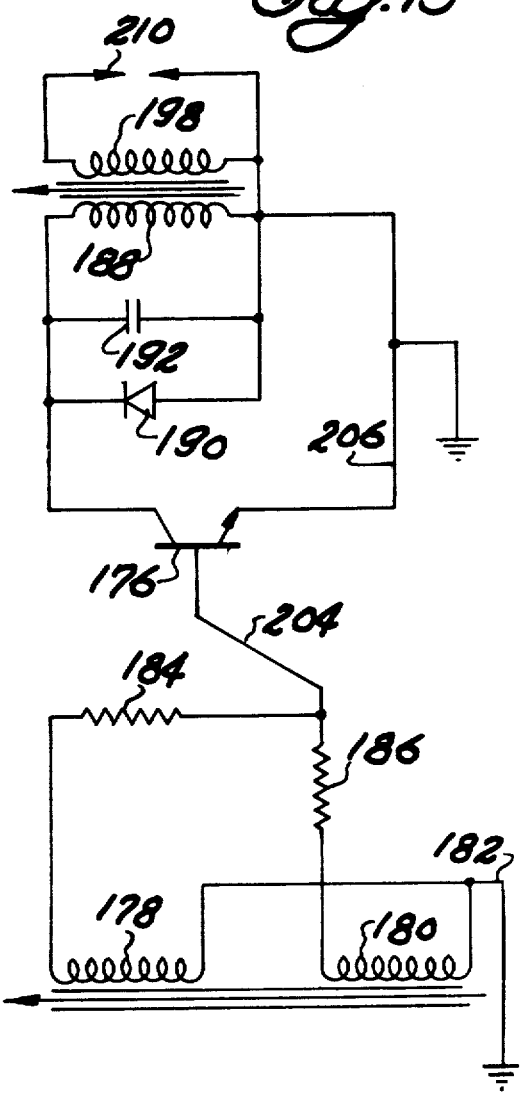
FIG. 15 is a circuit diagram illustrating a fourth embodiment of the invention.

The two trigger impulse embodiment of FIG. 15

Figure 16:
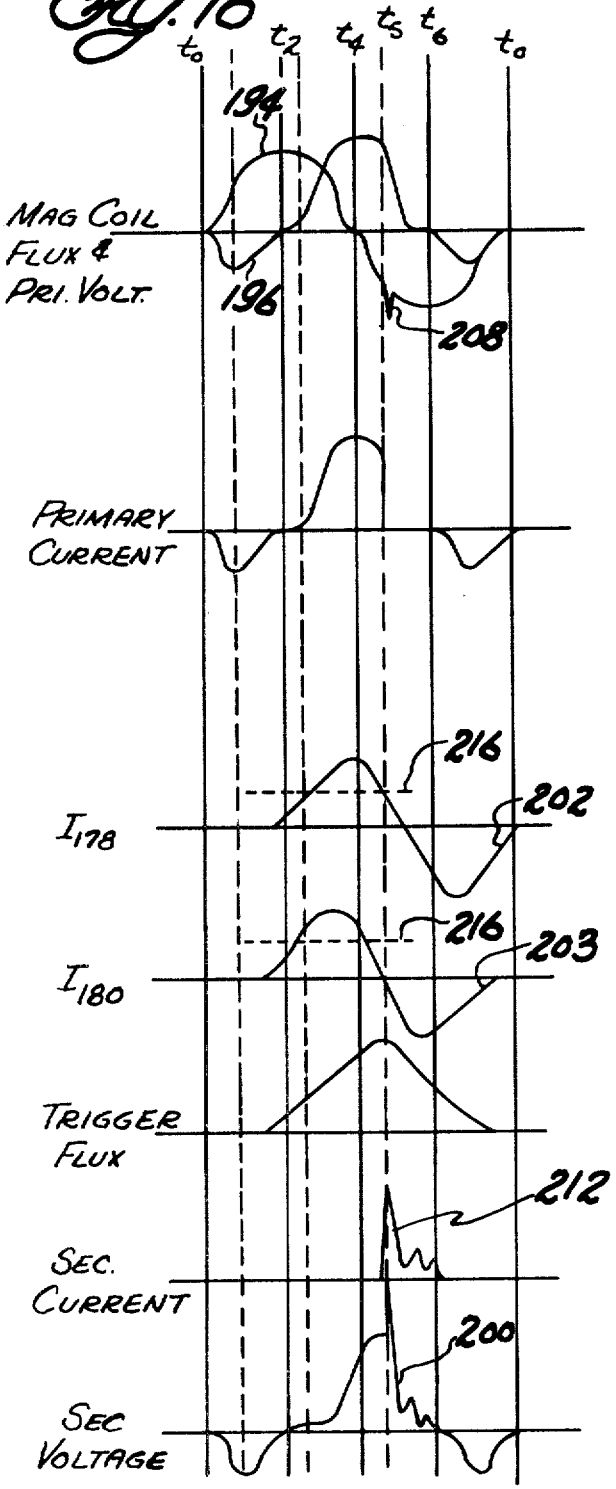
FIG. 16 is a set of curves illustrating the electrical and magnetic phenomena occurring in the embodiment of FIG. 15 during the typical ignition cycle.

The embodiment of FIG. 15 is very similar to the embodiment of FIG. 5 in its general configuration and overall operation. However, it has important relative advantages and disadvantages, as will be described below. In this embodiment the control device is an NPN switching type transistor 176. In employing the transistor 176 as the solid state control device in the various configurations already described, the pole pieces, such as pole pieces 28 and 30 of FIG. 1, must be altered to vary the shape and length of the pulse generated thereby. In the embodiment of FIG. 15, two coils 178 and 180 are wound upon a trigger core such as the core 52 in FIG. 1. The coils and core are so designed and related that trigger flux, as illustrated by curve 214 in FIG. 16, is generated producing the currents shown by curves 202 and 204.

The coils 178 and 180 are connected in common to a ground bus 182 and through respective resistors 184 and 186 to the base of transistor 176. Transistor 176 acts as a three terminal switch in the embodiment of FIG. 15 and the switching signals are applied to the base of transistor 176 from windings 178 and 180. The switched energy is generated in first winding 188 and applied to the parallel combination of diode 190, transistor 176 and capacitor 192.

As the flywheel rotates and the pole pieces approach the magneto winding assembly, a flux is generated in the magneto winding 188 which produces an initial current substantially by-passed by diode 190. Thereafter a positive voltage is generated which is utilized by transistor 176 to generate the spark impulse. The characteristics of the circuit are illustrated in FIG. 16 where it can be seen that the positive build-up of flux between the time $T_0$ and the time $T_2$, as shown by curve 194, produces a small negative going voltage 196. From time $T_2$ to time $T_4$ the flux diminishes to zero as the flux in the two outer core legs is balanced. At time $T_4$ the voltage has risen to a positive maximum as shown by curve 196.

During the positive voltage cycle the diode 190 is biased off so that a substantial voltage appears between the collector and the emitter of transistor 176. The voltage build-up in the first winding is clear from curve 196 and the voltage in the second winding 198 is illustrated by curve 200 in FIG. 16.

The triggering voltage generated in winding 178 is shown in curve 202 and the voltage generated in winding 180 is illustrated by curve 203 in FIG. 16, where it can be seen that all control is provided by the first, positive going half cycle which has been substantially lengthened in comparison to the previous embodiments. By virtue of the inductance of the windings and the related resistors 184 and 186, the two windings 178 and 180 which are wound on a common triggering core such as core 52 in FIG. 1 experience similar voltage excursions at a slightly displaced time. Thus, the current in winding 180 leads the current in winding 178 by a small angle and both currents are applied to the base of transistor 176 in an additive positive going direction to produce base current through conductors 204 and 206 to ground.

The base current biases the transistor 176 for conduction so that from time $T_2$ to time $T_5$ the bias currents through the transistor 176 exceed the levels indicated by broken lines 216 and the transistor is, therefore, switched on and conductive. At time $T_5$ the current through transistor 176 has been reduced to a point where transistor 176 is cut off, producing a rapid, negative flux change in the primary winding 188 as illustrated by peak 208 in FIG. 16. This substantial negative going pulse 208 produces voltage breakdown across the spark gap 210 and, consequently, an ignition current impulse at time $T_5$, as illustrated by curve 212. The capacitor 192 provides additional energy to the primary winding 188 which is reflected as increased current across the spark gap 210, as illustrated by the curve 212.

Thereafter, the primary voltage falls until, at time $T_6$, the flux reaches a negative maximum and the subsequent negative voltage impulse is shunted through the diode 190 until a new cycle starts at time $T_0$.

In this embodiment, as in the embodiment of FIG. 5, there is a natural and automatic phase shift or ignition retard produced by the use of two trigger windings connected in parallel through resistors, the circuit of winding 180 having less inductance and greater resistance than the circuit of winding 178. As the engine is accelerated the rate of change of flux increases providing greater relative control in winding 180 and producing ignition at an earlier time and, consequently, a spark advance.

While an NPN transistor has been described in the embodiment described above, it will be apparent that a PNP type may be employed with equal satisfaction. However, in that event the polarity of the diode 190 will be correlated to the transistor and the windings 178, 180 and 188 will be reconnected to provide an initial negative impulse for control purposes. Moreover, while a common emitter configuration is here employed, with proper design a common base configuration could also be employed. The transistor version of the invention as shown in FIG. 15 has certain advantages over the embodiments described above which employ threshold devices. In general, the embodiment of FIG. 15 will be less costly and have a lower saturation voltage and, thus, slightly greater efficiency. However, the embodiments of FIGS. 3, 5 and 7, which use threshold devices, have the advantages of greater precision in timing, a greater control of the timing, the ability to handle larger power in the main gap and the ability to employ multiple pulses for independent control of the turn-on and turn-off times.

The transistor of FIG. 15 and the threshold devices as defined in FIGS. 3, 5 and 7 comprise "solid state control devices." "Solid state control devices" is used in this specification to describe any solid state device or a combination of elements including a solid state device which are capable of producing the effects described with respect to the embodiments of FIGS. 3, 5, 7 and 15. Namely, any solid state device or assembly which bypasses the current from the primary winding during an initial portion of the positive-going cycle and thereafter effectively opens the primary circuit in a very short time to produce a substantial flux excursion and consequent ignition impulse is a solid state control device.

In addition to the foregoing specific examples of solid state control devices, an SCR might be employed in a similar circuit in cooperation with a capacitor or other storage system for effectively opening the SCR for a sufficient time to turn off the SCR so that a desired voltage impulse is produced.

Alternate mechanical constructions

While one particular layout of the mechanical components is illustrated in FIG. 1, the components may be rearranged for greater compactness and an increased flywheel size. One such alternate construction is illustrated in FIG. 4. There an enlarged flywheel 120 carries the magneto armature 122 and associated permanent magnet 124. Also, carried on magneto flywheel 120 is the diametrically opposed trigger armature 126. However, in this embodiment, the trigger armature 126 does not include a permanent magnet, and both the magneto coil construction and triggering coil construction are disposed within the flywheel. A magneto core 128 is disposed within the flywheel and mounted on a stator 130. The core 128 has legs 132, 134 and 136 shaped to conform to the internal surfaces of the flywheel, but otherwise the structure is the same as that described with respect to FIG. 1. The first and second windings 42 and 44 are disposed on the central leg 136 in the manner already described, and the windings are connected through a cable 46 to the control circuit 48.

A permanent magnet 138 is necessary in the magnetic trigger circuit, as the magnet 124 cannot perform the dual function of magnet 32 in FIG. 1. Poles 140 and 142 are secured to the magnet 138, and the assembly is mounted on a plate 144 which is, in turn, adjustably mounted by screws 146 and elongate openings for adjustment on stator 130. One or more coils are formed upon the legs 140 and 142, and these may include coil 50, coil 104 and coil 162.

If it is desirable to mount the magnet associated with the triggering coil in the flywheel, the embodiment diagrammatically illustrated in FIG. 6 is advantageous. Therein, the magneto core 128 and windings 42 and 44 are as described in FIG. 4. The magneto magnet 150 and poles 152 and 154 are shown diagrammatically, but function as already described with respect to FIG. 4. The trigger coil 50 and additional coils as desired are mounted on a core 156 to cooperate with armature poles 158 and 159 and permanent magnet 160 mounted in the flywheel. In such a construction, the critical factor is to select the gaps between the poles 158 and 159 of the trigger armature such that they are ineffective as they pass the magneto core 128. If the spacing of the legs and poles of trigger armature and core is improper, the armature will appear to the magneto core 128 as the magneto armature and produce a maverick spark.

The foregoing embodiments have brought several important features in common which constitute important novel aspects of the instant invention. These include the use of trigger windings, the use of means to initiate and terminate conduction through a solid state control device, the provision of means to prevent the generation of undesirable or maverick spark impulses, the use of threshold devices for augmented power capabilities and improved spark characteristics, and the provision of means to provide a step function of flux change in the magneto coils to produce a voltage impulse of improved shape and sufficient to initiate spark ignition. Moreover, the instant disclosure provides means for controlling timing, either on a preset or adjustable basis or in response to engine speed. Furthermore, utilizing the teaching of the instant invention, one may provide augmented flux change in the magneto coils by virtue of rapid switching and energy storage for switching purposes. Various other constructions and variations will immediately appear to one skilled in the art which will utilize all of the foregoing teaching.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

What is claimed is:

[1. In a magneto system including stator means, rotor means cyclically movable relative to said stator means and a magnetoelectric assembly including armature means on said rotor means and magnetically coupled first and second winding means on said stator means, said armature means inducing voltages in said first and second winding means as said rotor means moves relative to said stator means, the improvement comprising a solid state threshold device having conductive terminals connected across said first winding means and trigger coil means mounted on said stator means and providing a timed bipolar cyclic electrical signal in response to movement of said rotor means, said trigger coil means being electrically connected to said threshold device to render said threshold device conductive at an initial time in the cycle of movement when said signal is of one polarity and substantially nonconductive at a predetermined later time during said cycle of said rotor when said polarity is reversed, said solid state threshold device having characteristics such that it remains nonconductive until said trigger coil means renders it conductive in a subsequent cycle, a high voltage impulse being generated in said second winding means in response to said timed electrical signal.]

[2. The magneto system of claim 1 including a trigger coil assembly mounted on said stator means, a source of magnetic flux mounted on said rotor means, magnetic pole pieces mounted on said rotor in association with said flux source, said pole pieces cooperating with said magneto coil assembly to generate a voltage therein, and second pole pieces mounted in said rotor in association with said flux source, said second pole pieces cooperating with said trigger coil assembly to generate a voltage therein, and circuit means operatively interconnecting said coil assemblies.]

[3. The magneto system of claim 1 wherein said trigger coil means provides timed electrical signals having a gradually increasing magnitude directly related to the rate of movement of said rotor means, conduction between said conductive terminals being terminated at earlier times in said cycle for increased rates of rotor movement.]

[4. The magneto system of claim 1 wherein said trigger coil means comprises a first trigger coil and a second trigger coil, each providing a bipolar cyclic signal to said threshold device, said threshold device being rendered nonconductive at low rates of rotor movement in response to the combined energy of said coils, the signal of one of said coils terminating conduction through said threshold device at an advanced time in said cycle for increased rates of rotor movement.]

[5. The magneto system of claim 4 wherein the effective ratio of inductance to resistance in said first coil is substantially different from the effective ratio of inductance to resistance in said second coil.]

[6. The magneto system of claim 5 including means for altering the effective ratio of inductive reactance to resistance of one of said coils, the relationship of the time at which the threshold device is rendered nonconductive to the rate of rotor movement being controllable thereby.]

[7. The magneto system of claim 1 wherein said trigger coil means includes a first coil connected to said threshold device to initiate conduction therein at said initial time, a second coil and an energy storage circuit energized therefrom, and a third coil connected to said energy storage circuit to apply said energy storage circuit to said threshold device at said later time.]

8. In a magneto system including stator means, rotor means cyclically movable relative to said stator means and a magnetoelectric assembly including two poled armature means and a flux source on said rotor means, an E-shaped magnetic core having first, center and last legs and secured to said stator means, said core cooperating with said armature means to provide low reluctance flux paths first between said first and center legs and subsequently between said center and last legs as said rotor moves through its cycle, and first and second winding means coupled to said center leg to produce in each of said winding means a first voltage, a second voltage of reversed polarity and a third voltage of the same polarity as said first voltage as said rotor moves through said cycle, the improvement comprising a solid state threshold device having conductive terminals connected across said first winding and poled for conduction in response to said second voltage and trigger coil means mounted on said stator means and providing a timed cyclic bipolar electrical signal in response to movement of said rotor means, said trigger coil means being electrically connected to said threshold device to render said threshold device conductive at an initial time in the cycle of movement when said signal is of a first polarity and substantially nonconductive at a predetermined later time during said cycle of said rotor when said polarity is reversed, said solid state threshold device having characteristics such that it remains nonconductive until said trigger coil means renders it conductive in a subsequent cycle, a high voltage impulse being generated in said second winding in response to said timed electrical signal[.] *rendering said solid state threshold device nonconductive.*

9. The magneto system of claim 8 wherein said trigger coil means comprises a first trigger coil and a second trigger coil, each providing a bipolar cyclic signal to said threshold device, said threshold device being rendered nonconductive at low rates of rotor movement in response to the combined energy of said coils, the signal of one of said coils predominating in terminating conduction through said threshold device for increased rates of rotor movement.

10. The magneto system of claim 9 wherein the effective ratio of inductance to resistance in said first coil is substantially different from the effective ratio of inductance to resistance in said second coil.

11. The magneto system of claim 10 including means for altering the effective ratio of inductance to resistance of one of said coils, the relationship of said high voltage impulse to rate of rotor movement being controllable thereby.

12. The magneto system of claim 8 wherein said trigger coil means includes a first coil connected to said threshold device to initiate conduction therein at said initial time, a second coil and an energy storage circuit energized therefrom, and a third coil connected to said energy storage circuit to apply said energy storage circuit to said threshold device at said later time.

[13. In a magneto system including a magnetoelectric assembly having winding means and flux means, said winding means and flux means being cyclically movable relative to one another in a flux linking relationship, the improvement comprising a solid state threshold device having conductive terminals connected across said winding means and a control terminal, and means activated by said cyclic movement and electrically connected to the control terminal of said threshold device to render said threshold device conductive at an initial time in the cycle of movement and substantially nonconductive at a later predetermined time during said cycle, said solid state threshold device having characteristics such that it remains nonconductive until said means activated by said cyclic movement renders it conductive in a subsequent cycle, a high voltage impulse being generated in said winding means in response to the rendering of said threshold device nonconductive.]

[14. In a magneto system including a magnetoelectric assembly having magnetically coupled first and second winding means and flux means, said winding means and flux means being cyclically movable relative to one another in a flux linking relationship, the improvement comprising a solid state threshold device having conductive terminals connected across said first winding means and a control terminal and control means activated by said cyclic movement and electrically connected to said control terminal to render said threshold device conductive at an initial time in the cycle of movement and substantially nonconductive at a later predetermined time during said cycle, said solid state threshold device having characteristics such that it remains nonconductive until said means activated by said cyclic movement renders it conductive in a subsequent cycle, a high voltage impulse being generated in said second winding means in response to the rendering of said threshold device nonconductive.]

[15. The magneto system of claim 14 wherein said threshold device has an anode connected to one terminal of said first winding means and a cathode connected to the other terminal of said first winding means, and wherein diode means is connected across said first winding with its cathode connected to said one terminal and its anode connected to said other terminal.]

*16. In a magneto system including stator means, rotor means cyclically movable relative to said stator means and a magnetoelectric assembly including armature means on said rotor means and magnetically coupled first and second winding means on said stator means, said armature means inducing voltages in said first and second winding means as said rotor moves relative to said stator means, the improvement comprising a solid-state threshold device having conductive terminals connected across said first winding means and a trigger coil means mounted on said stator means and providing a timed bipolar cyclical electri-*

*cal signal in response to movement of said rotor means, said trigger coil means being electrically connected to said threshold device to render said threshold device conductive at an initial time in the cycle of movement when said signal is of one polarity and substantially nonconductive at a predetermined later time during said cycle of said rotor when said polarity is reversed, said solid state threshold device having characteristics such that it remains nonconductive until said trigger coil means renders it conductive in a subsequent cycle, a high-voltage impulse being generated in said second winding means in response to said timed electrical signal rendering said solid-state threshold device nonconductive, said trigger coil means including a first trigger coil and a second trigger coil, each providing a bipolar signal to said threshold device, said threshold device being rendered nonconductive at low rates of rotor movement in response to the combined energy of said coils, the signal of one of said coils terminating conduction through said threshold device at an advanced time in said cycle for increased rates of rotor movement.*

*17. The magneto system of claim 16 wherein the effective ratio of inductance to resistance in said first coil is substantially different from the effective ratio of inductance to resistance in said second coil.*

*18. The magneto system of claim 17 including means for altering the effective ratio of inductive reactance to resistance of one of said coils, the relationship of the time at which the threshold device is rendered nonconductive to the rate of rotor movement being controllable thereby.*

*19. The magneto system of claim 16 wherein said trigger coil means includes a first coil connected to said threshold device to initiate conduction therein at said initial time, a second coil and an energy storage circuit energized therefrom, and a third coil connected to said energy storage circuit to apply said energy storage circuit to said threshold device at said later time.*

* * * * *